(12) United States Patent
Jalla

(10) Patent No.: US 9,991,767 B2
(45) Date of Patent: Jun. 5, 2018

(54) HEAD END POWER MODULE HAVING TWO INVERTERS

(71) Applicant: Electro-Motive Diesel, Inc., Lagrange, IL (US)

(72) Inventor: Madan Mohan Jalla, Woodridge, IL (US)

(73) Assignee: Progress Rail Services Corporation, Albertville, AL (US)

( * ) Notice: Subject to any disclaimer, the term of this patent is extended or adjusted under 35 U.S.C. 154(b) by 87 days.

(21) Appl. No.: 14/586,262

(22) Filed: Dec. 30, 2014

(65) Prior Publication Data

US 2016/0190969 A1 Jun. 30, 2016

(51) Int. Cl.
| | |
|---|---|
| *H02P 3/00* | (2006.01) |
| *H02K 11/02* | (2016.01) |
| *B60L 1/00* | (2006.01) |
| *B60L 11/12* | (2006.01) |
| *B60L 15/32* | (2006.01) |

(52) U.S. Cl.
CPC .............. *H02K 11/024* (2013.01); *B60L 1/00* (2013.01); *B60L 11/12* (2013.01); *B60L 15/32* (2013.01); *B60L 2200/26* (2013.01); *B60L 2210/40* (2013.01); *B60L 2240/526* (2013.01); *B60L 2240/527* (2013.01); *B60L 2240/529* (2013.01); *Y02T 10/7077* (2013.01); *Y02T 10/7241* (2013.01)

(58) Field of Classification Search
USPC ......... 318/494, 400.17, 400.26, 801, 400.14, 318/780, 813
See application file for complete search history.

(56) References Cited

U.S. PATENT DOCUMENTS

| | | | | |
|---|---|---|---|---|
| 5,142,468 | A | * 8/1992 | Nerem | .................... H02M 7/48 307/14 |
| 7,940,016 | B2 | 5/2011 | Donnelly et al. | |
| 2011/0182093 | A1 | * 7/2011 | Brogan | ................... H02M 1/12 363/79 |
| 2012/0119583 | A1 | * 5/2012 | Allfather | ................. H02J 9/062 307/72 |

FOREIGN PATENT DOCUMENTS

EP 0 646 487 B1 8/1998

* cited by examiner

*Primary Examiner* — Eduardo Colon Santana
*Assistant Examiner* — Iftekhar Mustafa
(74) *Attorney, Agent, or Firm* — Finnegan, Henderson, Farabow, Garrett & Dunner, LLP

(57) ABSTRACT

The present disclosure is directed to a method for generating power for a machine. The method may include inverting a common power at a first location and outputting a first inverted power. The method may further include inverting the common power at a second location, outputting a second inverted power, and shifting an operational phase of the second inverted power so that the first inverted power and the second inverted power are in phase. The method may further include passing the first inverted power to a transformer, passing the second inverted power to the transformer, and transforming the first inverted power and the second inverted power to a transformed power.

3 Claims, 3 Drawing Sheets

HEAD END POWER MODULE HAVING TWO INVERTERS

TECHNICAL FIELD

The present disclosure relates generally to a head end power module and, more particularly, to a head end power module having two inverters.

BACKGROUND

Passenger train locomotives include a head end power module for generating power for auxiliary demands on the train such as lighting, a 120 V power supply, and other electric needs. The head end power module, usually at the front of the locomotive or "head" of the train, is often equipped with at least one internal combustion engine to drive one or more electric generators. Some head end power modules include one or more power inverters to invert varying input DC link voltage from the generator to a constant output AC voltage. In order to produce constant power to supply the auxiliary demands, the generator typically runs at a high RPM (usually top operational speed) at all times. When the train is stopped at a station, running the generator at top speed may be loud and may consume high amounts of fuel.

One example of a system for converting AC power is described in U.S. Pat. No. 7,385,372 ("the '372 patent") filed by Ahmad on Jun. 10, 2008. The '372 patent describes a system that includes two inverters arranged in parallel to receive DC power from two rectifiers. The two inverters provide power to one or more traction motors and to auxiliary devices. By using two inverters, the generator may be run at low speeds.

Although the '372 patent may provide for reduced generator speeds, it may still be less than optimal. In particular, the system of the '372 patent may be difficult to control. In order to reduce the operational speed of the generator, the two power inverters must be configured in parallel. However, synchronization of the two power inverters may be sub-optimal at lower speeds because control of two inverters configured in parallel is difficult. In particular, the output of the two converters is difficult to synchronize when controlled together due to varying generator speeds in operation. Without synchronized independent control of the power inverters, an associated harmonic content may be unnecessarily high.

The head end power module of the present disclosure solves one or more of the problems set forth above and/or other problems in the art.

SUMMARY

In one aspect, the present disclosure is directed to a power module for a machine. The power module may include a first power inverter and a second power inverter. The module may also include a first controller connected to the first power inverter and configured to selectively shift an operational phase of the first power inverter. The module may further include a second controller connected to the second power inverter, and a transformer. The transformer may include a first primary winding connected to the first power inverter and a second primary winding connected to the second power inverter.

In another aspect, the present disclosure is directed to a method for generating power for a machine. The method may include inverting a common power at a first location and outputting a first inverted power. The method may further include inverting the common power at a second location, outputting a second inverted power, and shifting an operational phase of the second inverted power so that the first inverted power and the second inverted power are in phase. The method may further include passing the first inverted power to a transformer, passing the second inverted power to the transformer, and transforming the first inverted power and the second inverted power to a transformed power.

In another aspect, the present disclosure is directed to a power module for a locomotive. The power module may include a first power inverter, a second power inverter, and a first controller connected to the first power inverter. The first controller may be configured to retrieve a first power characteristic and selectively shift an operational phase of the first power inverter by about 180 degrees based on the first power characteristic. The power module may also include a second controller connected to the second power inverter. The second controller may be configured to retrieve a second power characteristic and selectively shift an operational phase of the second power inverter by about 180 degrees based on the second power characteristic. The power module may further include a transformer including a first primary winding and a second primary winding. The first power inverter may be connected to the first primary winding and pass the first inverted power to the transformer through the first primary winding. The second power inverter may be connected to the second primary winding and pass the second inverted power to the second primary winding. A first line filter may be connected between the first inverter and the transformer, where the first line filter is configured to reduce an harmonic signal component from the first inverted power. A second line filter may be connected between the second inverter and the transformer, where the second line filter is configured to reduce an harmonic signal component from the second inverted power.

DETAILED DESCRIPTION

Figure 1:
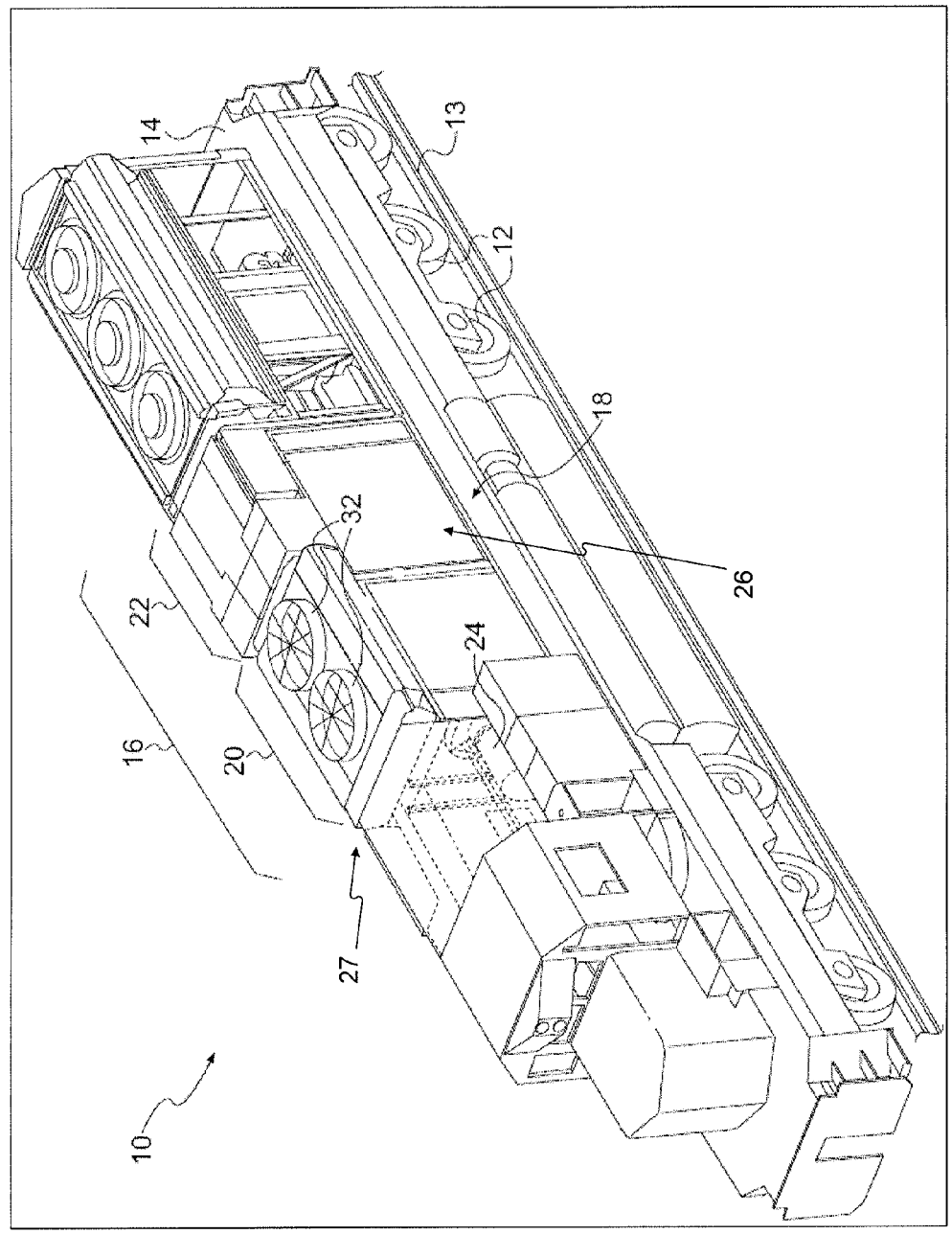
FIG. 1 is a diagrammatic illustration of an exemplary disclosed locomotive.

FIG. 1 illustrates a locomotive 10 having a plurality of wheels 12 configured to engage a track 13, a base platform 14 supported by wheels 12, and one or more head end power modules ("power modules") 16 mounted to base platform 14 and configured to drive wheels 12. Any number of power modules 16 may be included within locomotive 10 and operated to produce power that may be transferred to traction motors (not shown) used to drive wheels 12, and to provide auxiliary power service for passenger cars (not shown) towed by locomotive 10. In the exemplary embodiment shown in FIG. 1, locomotive 10 includes a single head end power module 16 aligned on base platform 14 along a length or travel direction of locomotive 10.

Head end power module 16 may be at least partially covered by an enclosure 18 and divided into a generator section 20 and an engine section 22 located rearward of generator section 20. Generator section 20 may house a generator 24 that is driven by a power source 26 (shown only in FIG. 2), which may be housed within engine section 22.

Power source 26 may be an internal combustion engine such as a diesel engine, a gasoline engine, or a gaseous-fuel powered engine that combusts a mixture of fuel and air to generate a mechanical input to generator 24. It is contemplated that head end power module 16 may be used with another type of power source such as, for example, a fuel cell.

Generator 24 may be connected to power source 26. Generator 24 may be a three-phase permanent magnet alternating field-type generator, an AC synchronous generator, or a switched-reluctance generator that is mechanically driven by power source 26 to produce electrical power. Generator 24 may be configured to produce a power output in response to a rotational input from power source 26. It is also contemplated that generator 24 may be a switched reluctance generator, a synchronous alternator, or any other appropriate type of generator known in the art. Generator 24 may include a rotor (not shown) rotatably connected to power source 26 by any means known in the art such as, for example, by a direct crankshaft connection, via a gear train, through a hydraulic circuit, or in any other appropriate manner. Generator 24 may be configured to produce electrical power output as the rotor is rotated within a stator (not shown) by power source 26.

A dynamic brake 27 may be associated with power module 16 and may include a resistive grid/fan combination connected to the motors (not shown) that drive wheels 12. During a dynamic braking event, the motors can be operated as generators, using wheels 12 to apply torque and generate electricity. The torque applied by the wheels 12 may slow locomotive 10, while the electricity may be directed through a resistive grid of dynamic brake 27. One or more fans 32 may be used to blow air through the grid to cool the grid and exhaust heated air out of locomotive 10.

Figure 2:
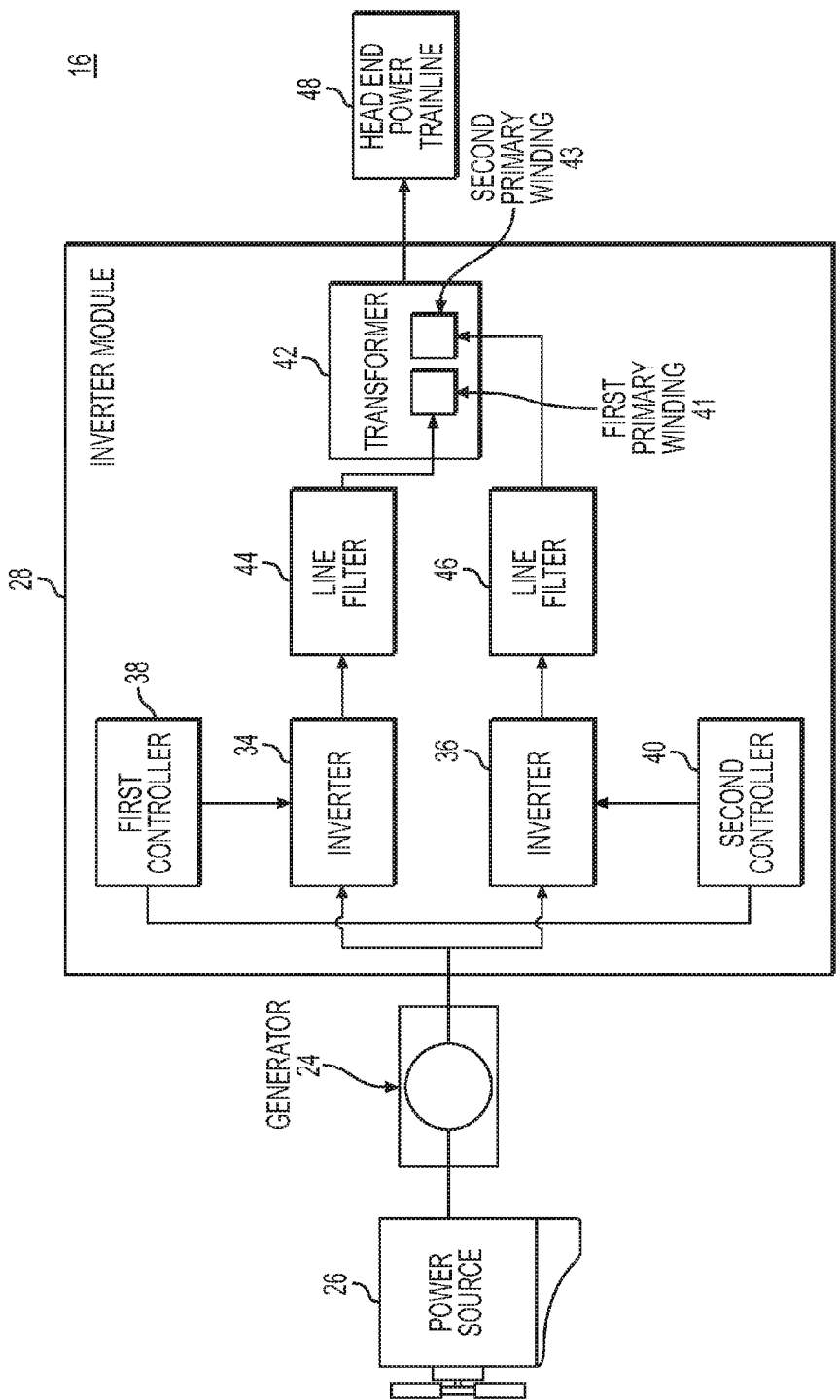
FIG. 2 is a diagrammatic illustration of an exemplary disclosed head end power module that may be used in conjunction with the locomotive of FIG. 1.

FIG. 2 depicts an exemplary disclosed head end power module 16 that may be used in conjunction with locomotive 10 of FIG. 1. As illustrated in FIG. 2, power source 26 may connect to generator 24 to supply power to an inverter module 28. Inverter module 28 may receive power from generator 24, rectify the power to DC, and provide the DC power to a head end power (HEP) trainline 48.

Inverter module 28 may include a first head end power inverter 34 (hereafter "inverter 34") and a second head end power inverter 36 (hereafter "inverter 36"). Inverters 34 and 36 may be connected to and independently controlled by a respective one of a first controller 38 and a second controller 40. Inverters 34 and 36 may be connected in parallel, and each may connect to an independent winding of transformer 42 through separate line filters 44 and 46. For example, inverter 34 may connect to a transformer 42 through a first primary winding 41, and inverter 36 may connect to transformer 42 through a second primary winding 43. Transformer 42 may supply power to head end power trainline 48.

Inverters 34 and 36 may receive DC power from one or more power sources, such as, for example, a third rail system (not shown), a battery (not shown), a hydrogen powered fuel cell (not shown), a supercapicitor (not shown), a braking system (e.g., dynamic brake 27) and/or one or more generators (e.g., generator 24). Power inverters 34 and 36 may rectify the power to three-phase 480 Vac output. The three-phase output may be provided to HEP trainline 48. Inverters 34 and 36 may each be uni-directional or bi-directional traction inverters. Power inverters 34 and 36 may each include one or more solid state devices including one or more diodes (not shown), one or more insulated gate bipolar transistors (IGBTs) (not shown), and/or one or more DC bus capacitors (not shown).

Controllers 38 and 40 may be in communication with inverters 34 and 36, respectively. Controllers 38 and 40 may also directly connect to each other, and may send information, receive information, and/or retrieve information, such as, for example, one or more power characteristic associated with the inverter to which each controller is connected. Each of controllers 38 and 40 may be configured to independently control the inverter to which it is connected. Controllers 38 and 40 may be embodied in a single microprocessor or multiple microprocessors and could be integrated into a respective one of inverters 34 and 36. Numerous commercially available microprocessors can be adapted to perform the functions of controllers 38 and 40. For example, controllers 38 and 40 may be field-programmable gate arrays (FPGAs). It should be appreciated that controllers 38 and 40 could readily be embodied in a general locomotive microprocessor capable of controlling numerous locomotive functions.

Controllers 38 and 40 may each include any means for storing and comparing information and controlling an operating parameter of locomotive 10 such as a memory, one or more data storage devices, or any other components that may be used to run an application. Furthermore, although aspects of the present disclosure may be generally described as being stored in memory, one skilled in the art will appreciate that these aspects can be stored on or read from types of computer-related products or computer-readable media such as computer chips and secondary storage devices, including hard disks, floppy disks, optical media, CD-ROM, or other forms of RAM or ROM. Various other known circuits may be associated with controllers 38 and 40, including power supply circuitry, signal-conditioning circuitry, solenoid driver circuitry, communication circuitry, and other appropriate circuitry.

Line filters 44 and 46 may receive AC power from inverters 34 and 36, respectively. Line filters 44 and 46 may be inductor-capacitor (LC) type filters configured to filter each of the three phases of power output for each of inverters 34 and 36. The purpose of line filters 44 and 46 may be to reduce the total harmonic distortion of the AC voltage on the output of inverters 34 and 36. The total harmonic distortion, or THD, of a signal is a measurement of the harmonic distortion present and is defined as a ratio of a sum of powers of all harmonic components to a power of a fundamental frequency. THD is used to characterize the power quality of electric power systems. Line filter 44 may receive AC power from inverter 34, remove harmonic content from the three-phase AC signal, and connect to first primary winding 41 of transformer 42. Line filter 46 may receive AC power from inverter 36, remove harmonic content from the three-phase AC signal, and connect to second primary winding 43 of transformer 42.

Transformer 42 may be a two primary delta-delta-wye type three-phase transformer. The purpose of transformer 42 may be to provide isolation for HEP trainline 48 and to step the output of line filters 44 and 46 down to a steady and useful voltage. For example, transformer 42 may receive power output from filters 44 and 46 and step the voltage to about 480 Vac.

Figure 3:
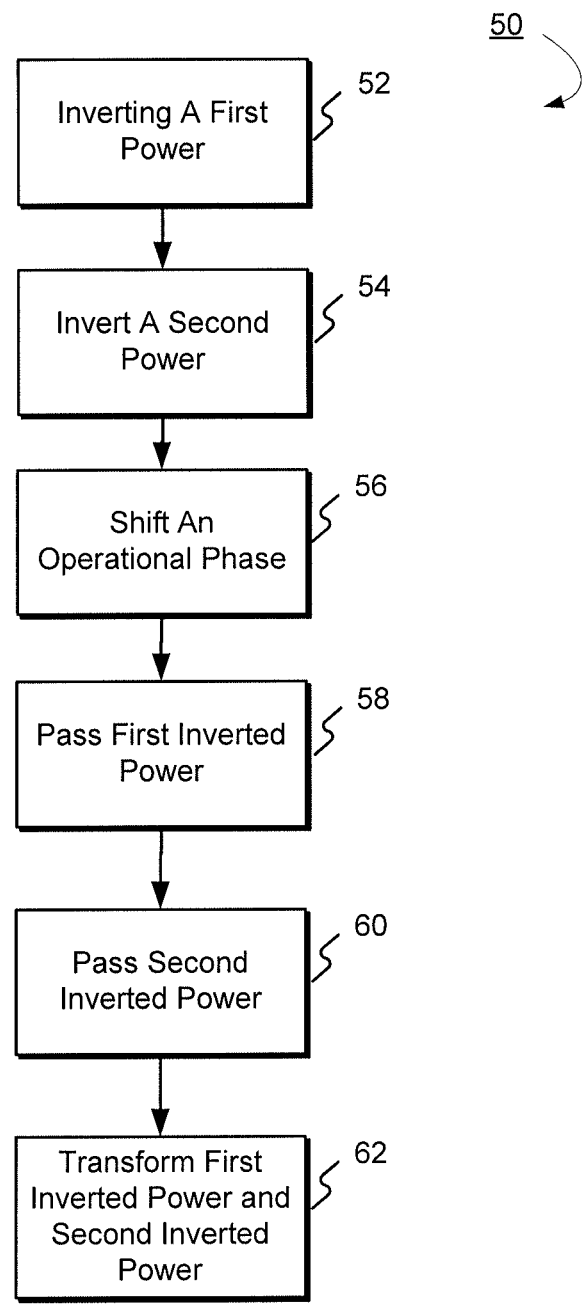
FIG. 3 is a flow chart showing operation of a head end power module according to an exemplary disclosed embodiment.

FIG. 3 will be discussed further in the following section to better illustrate the disclosed system and its operation.

INDUSTRIAL APPLICABILITY

Although the disclosed power module may apply to different machines where generation of high-quality (low-harmonic distortion) AC power is needed, the disclosed power module may find particular applicability with mobile machines such as locomotives that typically operates at varying motor speeds. The disclosed power module may provide power with low harmonic distortion, while operating at lower overall engine speeds.

According to one aspect illustrated in FIG. 3, the disclosed system may provide a method 50 for generating power for machine 10. Method 50 may include receiving a common DC power from one or more DC power supplies (e.g., from generator 24) at a first location, for example, at inverter 34, and inverting the common DC power to a first inverted power (step 52). The method may also include simultaneously receiving the common DC power from one or more DC power supplies at a second location, for example, at inverter 36, and inverting the common DC power to a second inverted power (step 54). The DC power received from generator 24 may be considered "common power" because inverter 34 and inverter 36 may be configured in parallel, and the common DC power may be inverted in parallel.

At step 56, head end power module 16 may shift an operational phase of one or more of the first inverted power and the second inverted power. More particularly, controller 38 may determine one or more power characteristics of the first inverted power. A power characteristic may be, for example, a voltage, a current, a temperature, a total harmonic distortion (THD), and/or another characteristic associated with the first inverted power output by inverter 34. Controller 40, which may be connected to and controlling inverter 36 may monitor the power characteristic at the first location, and selectively adjust a voltage of the second inverted power based on the power characteristic. Controller 40 may direct inverter 36 to adjust the second inverted power and/or current to match the voltage of the first inverted power based on the monitored power characteristic.

Controller 40 may also retrieve another power characteristic from controller 34, for example a fundamental frequency of the first inverted power. Controller 40 may connect directly to controller 38 and retrieve the power characteristic by querying a processor of controller 38. Systems with two power inverters connected in parallel may benefit from synchronizing the power at the second inverter to match the fundamental frequency of the first inverter, and shifting the operational phase of the second inverter (more particularly, shifting the phase of the second inverted power). In one aspect, the overall quality of power produced by head end power module 16 may be improved due to lower harmonic content. According to one aspect, at step 56, the operational phase of the second inverted power may be synchronized to the operational phase of the first inverted power, and shifted by about 180 degrees from the operational phase of the first inverted power. By shifting the operational phase of the second inverted power, harmonic content (e.g., THD) may be reduced.

At step 58, head end power module 16 may pass the first inverted power to a first transformer portion. More particularly, head end power module 16 may pass the first inverted power through line filter 44, which may remove a harmonic component from the first inverted power before passing the first inverted power to the first transformer portion. By removing the harmonic component, line filter 44 may reduce any residual harmonic distortion existing on the first inverted power.

Head end power module 16 may also pass the second inverted power to a second transformer portion (step 60). More particularly, head end power module 16 may pass the first inverted power through line filter 46, which may also remove a harmonic component from the second inverted power before passing the second inverted power to the second transformer portion. By removing the harmonic component, line filter 46 may reduce any residual harmonic distortion existing on the second inverted power. Although steps 58 and 60 are described as discrete steps, they may occur contemporaneously. More particularly, inverter 34 and inverter 36 may share the load of HEP trainline 48 substantially equally.

At step 62, head end power module 16 may transform the first inverted power, which is received at a first transformer portion, and transform the second inverted power, which is received at a second transformer portion. The first transformer portion may be a first primary winding 41 of transformer 42, and the second transformer portion may be a second primary winding 43 of transformer 42. Transformer 42 may transform the first inverted power and the second inverted power to three-phase AC power. The three-phase AC power may be connected to HEP trainline 48 and supply power the trainline load.

It will be apparent to those skilled in the art that various modifications and variations can be made to the disclosed head end power module without departing from the scope of the disclosure. Other embodiments of the head end power module will be apparent to those skilled in the art from consideration of the specification and practice of the head end power module disclosed herein. It is intended that the specification and examples be considered as exemplary only, with a true scope of the disclosure being indicated by the following claims and their equivalents.

What is claimed is:

1. A head end power module for a locomotive, comprising:
   a first power inverter;
   a second power inverter connected in parallel with the first power inverter;
   a first controller connected to the first power inverter and configured to selectively shift an operational phase of the first power inverter;
   a second controller connected to the second power inverter, the first controller being operatively connected to the second controller and configured to retrieve a power characteristic indicative of one or more of voltage, current and operational phase from the second controller and the second controller being operatively connected to the first controller and configured to retrieve a power characteristic indicative of one or more of voltage, current and operational phase from the first controller;
   wherein the first controller is configured to selectively shift an operational phase of the first power inverter based on the retrieved power characteristic and wherein the second controller is configured to selectively shift an operational phase of the second power inverter based on the retrieved power characteristic, the first controller being configured to shift the operational phase of the first power inverter by about 180 degrees from the operational phase of the second power inverter;
   a first line filter connected between the first inverter and the transformer, and
   a second line filter connected between the second inverter and the transformer, wherein the first line filter and the second line filter are configured to reduce a harmonic distortion from a power output for each of the first and second inverters; and a transformer including a first primary winding connected to the first power inverter and a second primary winding connected to the second power inverter.

2. A method for generating power in a head end power module of a locomotive for a head end power trainline, comprising:

inverting a common power at a first location in an inverter module and outputting a first inverted power;

inverting the common power in parallel at a second location in the inverter module and outputting a second inverted power;

monitoring a power characteristic associated with the first location;

selectively adjusting a voltage of the second inverted power based on the monitored power characteristic;

selectively shifting an operational phase of the second inverted power based on the power characteristic associated with the first location and so that the first inverted power and the second inverted power are in phase and synchronized with the operational phase of the second inverted power shifted by about 180 degrees from the operational phase of the first inverted power;

passing the first inverted power to a first transformer portion of a transformer;

passing the second inverted power to a second transformer portion of the transformer;

removing an harmonic component from the first inverted power before passing the first inverted power to the first transformer portion;

removing an harmonic component from the second inverted power before passing the second inverted power to the second transformer portion;

transforming the first inverted power and the second inverted power to a transformed power; and providing the transformed power to the head end power trainline.

3. A locomotive including a head end power module configured to provide power to a head end power trainline, the power module comprising:

a first power inverter;

a second power inverter;

a first controller connected to the first power inverter and configured to retrieve a first power characteristic and selectively shift an operational phase of the first power inverter by about 180 degrees based on the first power characteristic;

a second controller connected to the second power inverter and configured to retrieve a second power characteristic and selectively shift an operational phase of the second power inverter by about 180 degrees based on the second power characteristic;

a transformer including a first primary winding and a second primary winding, wherein:

the first power inverter is connected to the first primary winding and passes the first inverted power to the transformer through the first primary winding; and the second power inverter is connected to the second primary winding and passes the second inverted power to the second primary winding;

a first line filter connected between the first inverter and the transformer, wherein the first line filter is configured to reduce an harmonic signal component from the first inverted power; and a second line filter connected between the second inverter and the transformer, wherein the second line filter is configured to reduce an harmonic signal component from the second inverted power; and a head end power trainline configured to receive power from the transformer.

* * * * *